(12) United States Patent
Lin et al.

(10) Patent No.: US 10,444,779 B2
(45) Date of Patent: Oct. 15, 2019

(54) LOW DROPOUT VOLTAGE REGULATOR FOR GENERATING AN OUTPUT REGULATED VOLTAGE

(71) Applicant: MEDIATEK INC., Hsin-Chu (TW)

(72) Inventors: Hao-Yuan Lin, Taipei (TW); Chia-Hua Chou, Hsinchu (TW); Yen-Hsun Hsu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/730,877

(22) Filed: Oct. 12, 2017

(65) Prior Publication Data

US 2018/0120880 A1 May 3, 2018

Related U.S. Application Data

(60) Provisional application No. 62/416,736, filed on Nov. 3, 2016.

(51) Int. Cl.
| | | |
|---|---|---|
| *G05F 1/575* | (2006.01) | |
| *G05F 1/66* | (2006.01) | |
| *H02M 3/156* | (2006.01) | |
| *G05F 1/56* | (2006.01) | |
| *G05F 1/46* | (2006.01) | |
| *G05F 1/618* | (2006.01) | |
| *H02M 1/00* | (2006.01) | |

(52) U.S. Cl.
CPC ............... *G05F 1/575* (2013.01); *G05F 1/66* (2013.01); *H02M 3/156* (2013.01); *G05F 1/46* (2013.01); *G05F 1/618* (2013.01); *H02M 2001/0003* (2013.01); *H02M 2003/1566* (2013.01)

(58) Field of Classification Search
CPC ... G05F 1/575; G05F 1/46; G05F 1/56; G05F 1/565; G05F 1/595; G05F 1/618; G05F 1/66; G05F 1/10; G05F 1/461
See application file for complete search history.

(56) References Cited

U.S. PATENT DOCUMENTS

| | | | |
|---|---|---|---|
| 4,906,913 A * | 3/1990 | Stanojevic | G05F 1/56 323/273 |
| 5,325,258 A | 6/1994 | Choi et al. | |
| 2003/0111985 A1* | 6/2003 | Xi | G05F 1/575 323/273 |
| 2003/0178976 A1* | 9/2003 | Xi | G05F 1/575 323/273 |

(Continued)

OTHER PUBLICATIONS

Chinese language office action dated Oct. 1, 2018, issued in application No. TW 106137726.

*Primary Examiner* — Gustavo A Rosario-Benitez
(74) *Attorney, Agent, or Firm* — McClure, Qualey & Rodack, LLP

(57) ABSTRACT

A low dropout voltage regulator for generating an output regulated voltage is provided. The low dropout voltage regulator includes a first transistor and a current recycling circuit. The first transistor has a first terminal for receiving an input supply voltage, a second terminal for generating the output regulated voltage, and a control terminal for receiving a control voltage. The current recycling circuit is configured to drain a feeding current to the second terminal of the first transistor in response to a first signal having feedback information of the output regulated voltage.

6 Claims, 4 Drawing Sheets

(56) References Cited

U.S. PATENT DOCUMENTS

| | | | |
|---|---|---|---|
| 2006/0108993 A1* | 5/2006 | Chien | G05F 1/565 |
| | | | 323/282 |
| 2017/0090493 A1* | 3/2017 | Cui | G05F 1/575 |
| 2017/0178734 A1* | 6/2017 | Pasotti | H03F 3/45188 |
| 2017/0199537 A1* | 7/2017 | Duong | G05F 1/575 |

* cited by examiner

LOW DROPOUT VOLTAGE REGULATOR FOR GENERATING AN OUTPUT REGULATED VOLTAGE

This application claims the benefit of U.S. provisional application Ser. No. 62/416,736, filed Nov. 3, 2016, the subject matter of which is incorporated herein by reference.

FIELD OF THE INVENTION

The present invention relates to a voltage regulator, and more particularly to a power saving voltage regulator.

BACKGROUND OF THE INVENTION

A low dropout regulator (LDO) is a DC linear voltage regulator that can regulate the output voltage even when the supply voltage is very close to the output voltage. The advantages of an LDO include the absence of switching noise, smaller device size, and greater design simplicity. However, a quiescent current, also known as ground current or supply current, is drawn by the LDO in order to control the internal circuitry for proper operation. The quiescent current may lead to excessive power dissipation if the LDO is applied to a high transient current load in a low supply voltage environment. In this regard, there is a need for designing an LDO with low power consumption.

SUMMARY OF THE INVENTION

The disclosure is directed to a low dropout voltage regulator. One of the advantages of the proposed low dropout voltage regulator is reduced power consumption.

According to one embodiment, a low dropout voltage regulator for generating an output regulated voltage is provided. The low dropout voltage regulator includes a first transistor and a current recycling circuit. The first transistor has a first terminal for receiving an input supply voltage, a second terminal for generating the output regulated voltage, and a control terminal for receiving a control voltage. The current recycling circuit is configured to drain a feeding current to the second terminal of the first transistor in response to a first signal having feedback information of the output regulated voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

Figure 1:
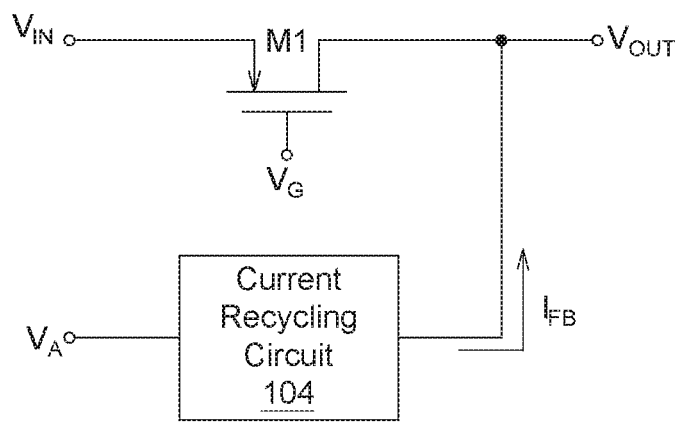
FIG. 1 illustrates a block diagram of a low dropout voltage regulator according to an embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF PREFERRED EMBODIMENTS

FIG. 1 illustrates a block diagram of a low dropout voltage regulator 10 according to an embodiment of the invention. The low dropout voltage regulator 10 includes a first transistor M1, a feedback path 102, and a current recycling circuit 104. The first transistor M1 has a first terminal for receiving an input supply voltage $V_{IN}$, a second terminal for generating the output regulated voltage $V_{OUT}$, and a control terminal for receiving a control voltage $V_G$. The current recycling circuit 104 is configured to drain a feeding current $I_{FB}$ in response to a first signal $V_A$. The first signal $V_A$ has feedback information of the output regulated voltage $V_{OUT}$. For example, there is an electrically coupled path between the output voltage regulated voltage $V_{OUT}$ and the first signal $V_A$. In one embodiment, the first signal $V_A$ is positively correlated with the output voltage regulated voltage $V_{OUT}$. In another embodiment, the first signal $V_A$ is negatively correlated with the output voltage regulated voltage $V_{OUT}$.

The first transistor M1 may be a power metal oxide semiconductor field effect transistor (MOSFET). In the example shown in FIG. 1, the first transistor M1 is a p-channel MOSFET (PMOS). In other embodiments, the first transistor M1 may also be other types of transistors, such as n-channel MOSFET (NMOS), bipolar junction transistor (BJT), junction gate field effect transistor (JFET), and so on. Using PMOS transistor as the first transistor M1 may be suitable for low supply voltage applications. For example, the input supply voltage $V_{IN}$ is 1.8V, and the output regulated voltage $V_{OUT}$ is about 1V. In the following description, PMOS transistor will be used as an example for the first transistor M1. However, the invention is not limited thereto.

The first terminal of the first transistor M1 is the source terminal of the PMOS transistor, the second terminal of the first transistor M1 is the drain terminal of the PMOS transistor, and the control terminal of the first transistor M1 is the gate terminal of the PMOS transistor. If the first transistor M1 is an NMOS transistor, the first terminal, the second terminal, and the control terminal are the drain terminal, the source terminal, and the gate terminal of the NMOS transistor, respectively. If the first transistor M1 is a PNP BJT, the first terminal, the second terminal, and the control terminal are the emitter terminal, the collector terminal, and the base terminal of the PNP BJT, respectively.

Figure 2:
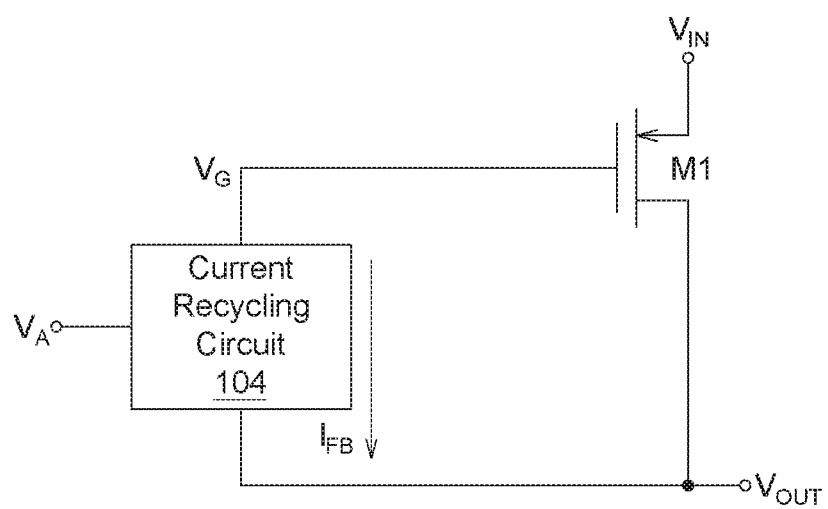
FIG. 2 illustrates a block diagram of a low dropout voltage regulator according to another embodiment of the invention.

FIG. 2 illustrates a block diagram of a low dropout voltage regulator 11 according to another embodiment of the invention. In this embodiment, the current recycling circuit 104 is coupled between the control terminal and the second terminal of the first transistor M1. In one embodiment, the current recycling circuit 104 is configured to provide the control voltage $V_G$ in response to the output regulated voltage $V_{OUT}$. The second terminal of the first transistor M1 may be coupled to a load device, which draws load current $I_{LOAD}$ during operation. For example, when the load current $I_{LOAD}$ increases, the output regulated voltage $V_{OUT}$ decreases temporarily. The first signal $V_A$ reflects the decreased output regulated voltage $V_{OUT}$, and then the current recycling circuit 104 decreases the control voltage $V_G$ correspondingly, such that the first transistor M1 is turned on, effectively decreasing the internal resistance of the first transistor M1. Therefore the output regulated voltage $V_{OUT}$ increases. In this way the output regulated voltage $V_{OUT}$ be kept as a stable regulated voltage.

The size of the first transistor M1 is usually large in order to provide sufficient driving capability. The first transistor M1 may have large parasitic capacitance, and thus there may be a large amount of charge stored in the first transistor M1. In the embodiment shown in FIG. 2, the current recycling circuit 104 is configured to drain a feeding current $I_{FB}$ from the control terminal of the first transistor M1 to the second terminal of the first transistor M1. As such, charge accumulated at the control terminal of the first transistor M1 (due to the bulky power MOS) can be drained to the output regulated voltage $V_{OUT}$ for power efficiency. In other words, energy is directly provided to the output regulated voltage $V_{OUT}$. The feeding current $I_{FB}$ flows directly to the second terminal of the first transistor M1, rather than flows to the ground node, thus preventing unnecessary power dissipation.

Figure 3:
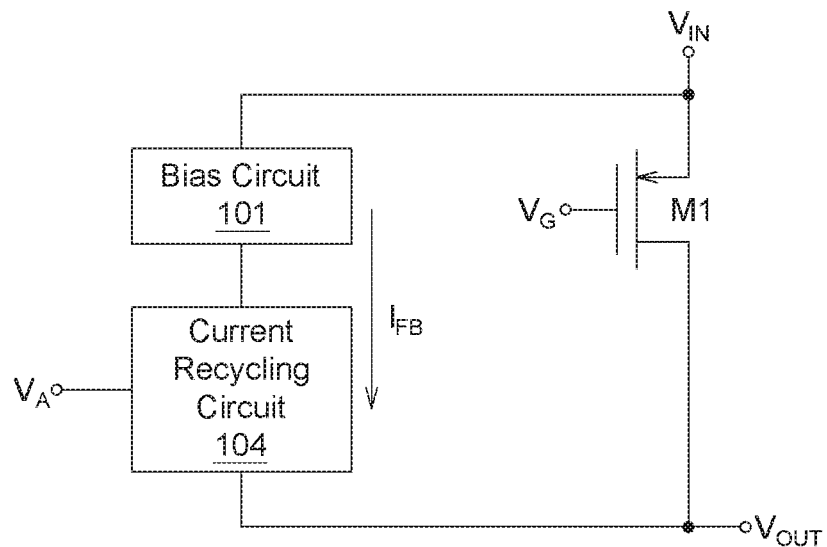
FIG. 3 illustrates a block diagram of a low dropout voltage regulator including a bias circuit according to an embodiment of the invention.

FIG. 3 illustrates a block diagram of a low dropout voltage regulator 12 including a bias circuit according to an embodiment of the invention. In this embodiment, the low dropout voltage regulator 12 includes a bias circuit 101 for the current recycling circuit 104. The bias circuit 101 may be configured to establish proper operating conditions, such as voltage and current, for the current recycling circuit 104. In the embodiment shown in FIG. 3, the bias circuit 101 is coupled to the first terminal of the first transistor M1. In some other embodiments, the bias circuit 101 may also be coupled to the control terminal of the first transistor M1. The bias circuit 101 generally carries a large amount of current. The current recycling circuit 104 is configured to drain the feeding current $I_{FB}$ from the bias circuit 101 to the second terminal of the first transistor M1. As such, energy flows from the bias circuit 101 directly to the output regulated voltage $V_{OUT}$, rather than flows to the ground node, thus preventing unnecessary power dissipation. Note that the embodiments shown in FIG. 2 and FIG. 3 may also be combined. For example, both the current recycling circuit 104 and the bias circuit 101 may be coupled to the control terminal of the first transistor M1.

Figure 4:
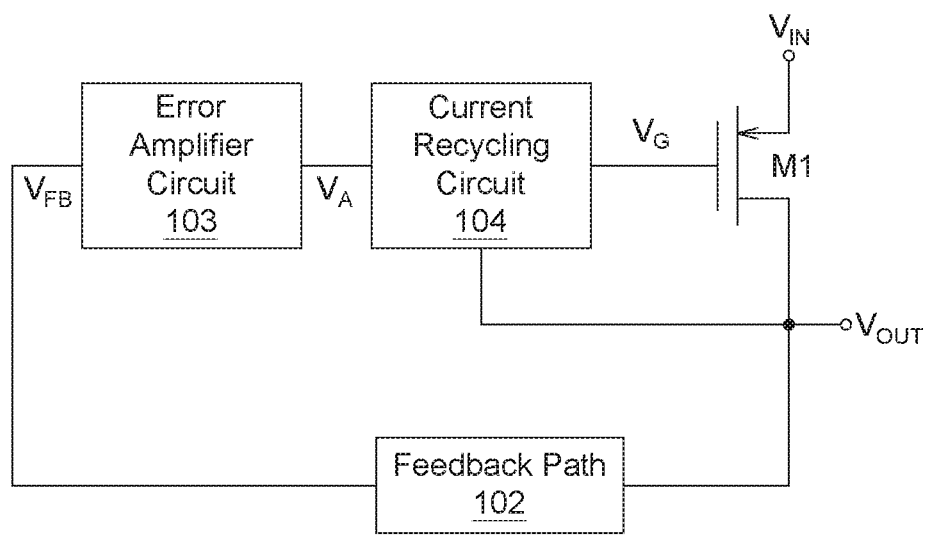
FIG. 4 illustrates a block diagram of a low dropout voltage regulator including an error amplifier circuit according to an embodiment of the invention.

FIG. 4 illustrates a block diagram of a low dropout voltage regulator 13 including an error amplifier circuit according to an embodiment of the invention. In this embodiment the low dropout voltage regulator 13 further includes a feedback path 102 and an error amplifier circuit 103. The feedback path 102 provides a feedback voltage $V_{FB}$ in response to the output regulated voltage $V_{OUT}$. The error amplifier circuit 103 is configured to amplify a voltage difference between the feedback voltage $V_{FB}$ and a reference voltage $V_{REF}$ to generate the first signal $V_A$.

There may be several implementations for the feedback path 102. In one embodiment, the feedback voltage $V_{FB}$ is substantially equal to the output regulated voltage $V_{OUT}$ via the feedback path 102. In another embodiment, the feedback path 102 may include a voltage divider, such that the feedback voltage $V_{FB}$ is a fraction of the output regulated voltage $V_{OUT}$. In still another embodiment, the feedback path 102 may include a coupling capacitor, such that the output regulated voltage $V_{OUT}$ information can be promptly passed to the error amplifier circuit 103 that receives the feedback voltage $V_{FB}$.

Figure 5:
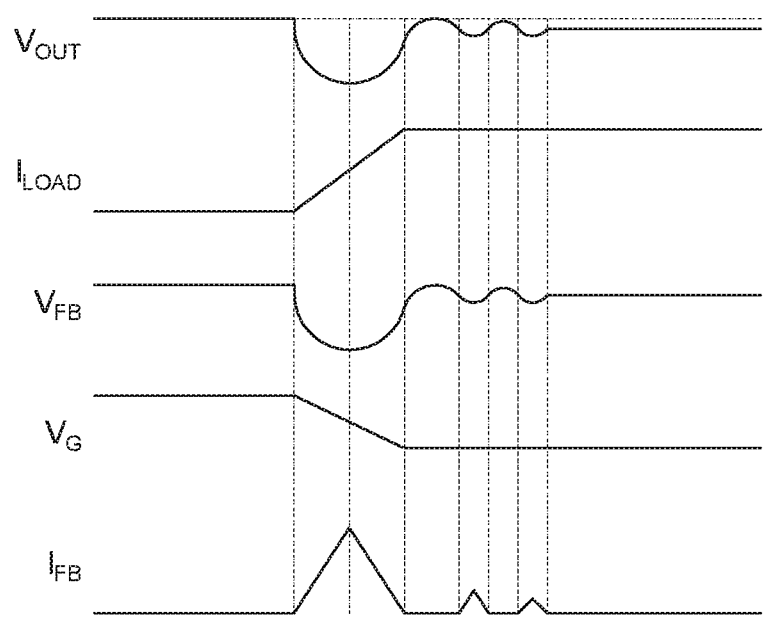
FIG. 5 illustrates a signal waveform of the low dropout voltage regulator shown in FIG. 4.

FIG. 5 illustrates a signal waveform of the low dropout voltage regulator shown in FIG. 4. When the load current $I_{LOAD}$ increases (a transient caused by the load device coupled to the second terminal of the first transistor M1), the output regulated voltage $V_{OUT}$ drops, and the voltage level of the feedback voltage $V_{FB}$ drops in turn. The first signal VA reflects the decreasing of the feedback voltage $V_{FB}$. The current recycling circuit 104 is configured to decrease the control voltage $V_G$ when the output regulated voltage $V_{OUT}$ decreases. Consequently, the output regulated voltage $V_{OUT}$ increases back to be close to its initial level.

As shown in FIG. 5, when the control voltage $V_G$ starts decreasing, the feeding current $I_{FB}$ increases, providing energy to the output regulated voltage $V_{OUT}$. A fast transient loop is formed by the current recycling circuit 104 to shorten the response time. The current recycling circuit 104 coupled between the control voltage $V_G$ and the output regulated voltage $V_{OUT}$ constitutes the shortest path in the low dropout voltage regulator 10.

In the embodiments provided above, the current recycling circuit 104 is configured to increase the feeding current $I_{FB}$ when the output regulated voltage $V_{OUT}$ decreases. Because the feeding current $I_{FB}$ flows directly to the output node of the low dropout voltage regulator 10, rather than flows to the ground node, the power consumption can be reduced. In addition, because the shortest path is introduced by the current recycling circuit 104, the response time of the low dropout voltage regulator 10 can also be reduced.

There may be several different implementations regarding the current recycling circuit 104. In one embodiment, the current recycling circuit 104 may be a buffer circuit coupled between the first signal $V_A$ and the first transistor M1. Any available architecture for the buffer circuit may be applied to the current recycling circuit 104.

Figure 6:
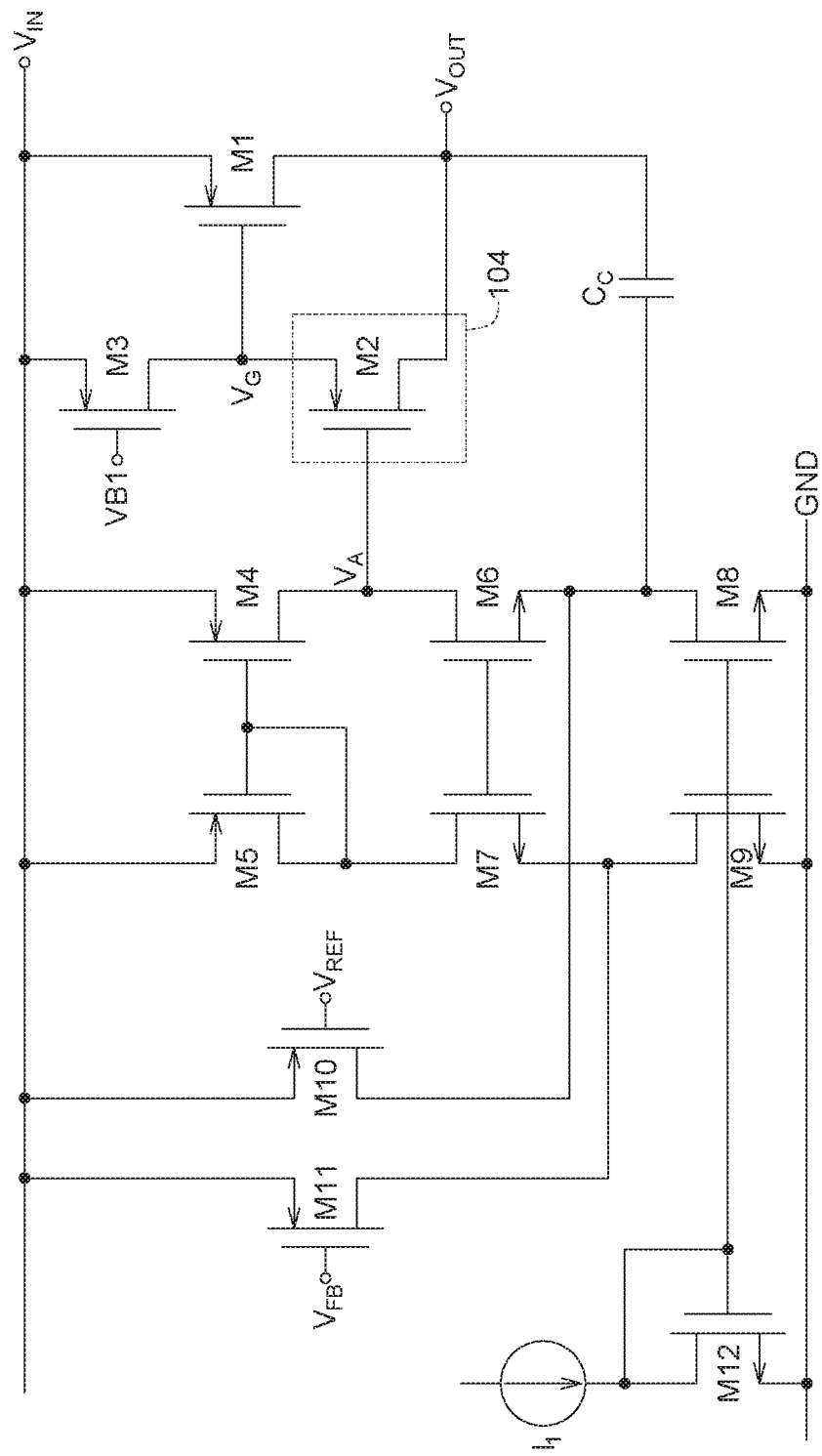
FIG. 6 illustrates a circuit schematic of a low dropout voltage regulator according to an embodiment of the invention.

FIG. 6 illustrates an example circuit schematic of a low dropout voltage regulator 14 according to an embodiment of the invention. In this embodiment, the current recycling circuit 104 includes a second transistor M2. The second transistor M2 is a PMOS transistor. In another embodiment, the second transistor M2 may be a different type of transistor. Also, the current recycling circuit 104 may include other transistors and components in addition to the second transistor M2. For example, the current recycling circuit 104 may also include additional passive devices, multiple cascade or cascode connected transistors, and so on. In the embodiment shown in FIG. 4, the second transistor M2 is the only element in the current recycling circuit 104. A single transistor implementation for the current recycling circuit 104 has the advantage of low hardware area, simplified circuit design, and low path delay.

FIG. 6 shows an example buffer impedance attenuation (BIA) low dropout voltage regulator (LDO). The BIA LDO has the advantage of better stability at fast transient due to its one-pole system in bandwidth. FIG. 6 shows a BIA LDO having the current recycling circuit 104 as described in the embodiments shown in FIG. 1-FIG. 4.

In this embodiment, the second transistor M2 (PMOS in this example) has a first terminal (source terminal) directly coupled to the control terminal of the first transistor M1, a second terminal (drain terminal) directly coupled to the second terminal of the first transistor M1, and a control terminal (gate terminal) for receiving the first signal $V_A$. The bias circuit 101 shown in FIG. 3 may include a third transistor M3 shown in FIG. 6. The third transistor M3 has a first terminal for receiving the input supply voltage VIN, a second terminal coupled to the control terminal of the transistor M1 and a control terminal for receiving a bias voltage VB1. In this embodiment, the output regulated voltage $V_{OUT}$ is fed back through a coupling capacitor $C_C$. The feedback voltage $V_{FB}$ (at the gate of the transistor M11) may be equal to or a fraction of the output regulated voltage $V_{OUT}$. The error amplifier circuit 103 shown in FIG. 4 may include the transistors M4-M11 shown in FIG. 6. The error amplifier circuit 103 is configured to amplify the voltage difference between the feedback voltage $V_{FB}$ and the reference voltage $V_{REF}$ (which may be provided by a bandgap reference circuit) to generate the first signal $V_A$. The transistors M3 and M12 are used for biasing a reference current to the BIA LDO shown in FIG. 6.

In this embodiment, the feeding current $I_{FB}$ may come from two sources, including the third transistor M3 and the charge stored at the gate of the first transistor M1. For example, when the output regulated voltage $V_{OUT}$ decreases, the second transistor M2 drains the feeding current $I_{FB}$ from the third transistor M3 and/or the control terminal of the first transistor M1 to the second terminal of the first transistor M1. The second transistor M2 constitutes the shortest path in the regulator circuit to enhance the response time.

Because the second transistor M2 is not directly coupled to the ground node GND (which has the most negative voltage level in the circuit), all the feeding current $I_{FB}$ is drained to the output regulated voltage $V_{OUT}$. The feeding current $I_{FB}$ does not flow to the ground node GND, and thus the quiescent current ($I_Q$) of the regulator circuit can be reduced, resulting in less power consumption.

The control voltage $V_G$ decreases when the output regulated voltage $V_{OUT}$ decreases. Because of the shortest path introduced by the second transistor M2, when the output regulated voltage $V_{OUT}$ starts bouncing back due to the first transistor M1 being turned on, the increased output regulated voltage $V_{OUT}$ quickly prevents the control voltage $V_G$ from deceasing or makes the control voltage $V_G$ increase as well. According to the circuit structure shown in FIG. 6, the energy stored at the control terminal of the first transistor M1 has nowhere else to go when the output regulated voltage $V_{OUT}$ boosts, and thus the control voltage $V_G$ stops decreasing. The control voltage $V_G$ then turns off the first transistor M1, preventing the output regulated voltage $V_{OUT}$ from overshooting (exceeding the target regulated voltage). In other words, the low dropout voltage regulator 14 can prevent overshoot inherently by introducing the current recycling circuit 104.

According to the embodiments described above, by adopting a current recycling circuit in the low dropout voltage regulator, a fast response time can be achieved. In addition, the quiescent current of the regulator circuit can be reduced, resulting in less power consumption. Moreover, the proposed low dropout voltage regulator can prevent overshoot inherently, resulting in a more stable output regulated voltage.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A low dropout voltage regulator for generating an output regulated voltage, the low dropout voltage regulator comprising:
    a first transistor, having a first terminal for receiving an input supply voltage, a second terminal for generating the output regulated voltage, and a control terminal for receiving a control voltage;
    a current recycling circuit, implemented by a single transistor, configured to drain a feeding current to an output node of the low dropout voltage regulator in response to a first signal having feedback information of the output regulated voltage, wherein the feeding current flows directly to the output node of the low dropout voltage regulator rather than flow to a ground node; and
    a bias circuit coupled to the first transistor and the current recycling circuit, wherein if the output regulated voltage decreases, the current recycling circuit drains the feeding current from the bias circuit and the control terminal of the first transistor to the output regulated voltage to increase the output regulated voltage;
    wherein the current recycling circuit is configured to increase the feeding current when the output regulated voltage decreases.

2. The low dropout voltage regulator of claim 1, wherein the current recycling circuit is coupled between the control terminal and the second terminal of the first transistor.

3. The low dropout voltage regulator of claim 2, wherein the current recycling circuit is configured to provide the control voltage in response to the output regulated voltage.

4. The low dropout voltage regulator of claim 1, further comprising:
    a feedback path, for providing a feedback voltage in response to the output regulated voltage; and
    an error amplifier circuit, for amplifying a voltage difference between the feedback voltage and a reference voltage to generate the first signal.

5. The low dropout voltage regulator of claim 1, wherein the current recycling circuit is a buffer circuit terminal directly coupled to the second terminal of the first transistor, and a control terminal for receiving the first signal.

6. The low dropout voltage regulator of claim 1, wherein the first transistor is a PMOS transistor.

\* \* \* \* \*